(12) United States Patent
Weber-Ingold

(10) Patent No.: US 11,044,529 B1
(45) Date of Patent: Jun. 22, 2021

(54) SYSTEMS AND METHODS FOR REAL-TIME USER VOTING CONTROL OF VIDEO MOVIE CONTENT

(71) Applicant: Tobias Weber-Ingold, Los Angeles, CA (US)

(72) Inventor: Tobias Weber-Ingold, Los Angeles, CA (US)

( * ) Notice: Subject to any disclaimer, the term of this patent is extended or adjusted under 35 U.S.C. 154(b) by 0 days.

(21) Appl. No.: 16/859,870

(22) Filed: Apr. 27, 2020

(51) Int. Cl.
*H04N 21/475* (2011.01)
*H04N 21/472* (2011.01)
*H04N 21/485* (2011.01)
*H04N 21/4402* (2011.01)
*H04N 21/488* (2011.01)
*H04N 21/431* (2011.01)

(52) U.S. Cl.
CPC ..... *H04N 21/4758* (2013.01); *H04N 21/4312* (2013.01); *H04N 21/4402* (2013.01); *H04N 21/47217* (2013.01); *H04N 21/4856* (2013.01); *H04N 21/4884* (2013.01)

(58) Field of Classification Search
None
See application file for complete search history.

(56) References Cited

U.S. PATENT DOCUMENTS

| | | | |
|---|---|---|---|
| 2007/0169165 A1* | 7/2007 | Crull | H04L 63/08 725/135 |
| 2007/0283008 A1* | 12/2007 | Bucher | H04L 67/22 709/224 |
| 2010/0228740 A1* | 9/2010 | Cannistraro | G06F 16/686 707/748 |
| 2013/0246522 A1* | 9/2013 | Bilinski | H04N 21/4825 709/204 |

* cited by examiner

*Primary Examiner* — Junior O Mendoza

(57) ABSTRACT

Systems and methods for hosting, streaming, and controlling video movie playback, that for the video playback uses a local or cloud based voting platform is disclosed. The systems and methods provide reduced system latency, and are fully scalable from a single user to multi-viewer modes, with the latter mode allowing for thousands of users viewing the video playback, and controlling the content display through a collective voting platform. In a preferred embodiment, the disclosed system includes three primary elements: a content control (cloud-based) engine, a data decision manager-server, and a local client platform. The content control engine controls the movie content to be streamed to the users. The data decision server manages the user input and voting that is transmitted to the content control engine. The local client platform provides the local interface with the user to elicit user selections and user votes.

19 Claims, 10 Drawing Sheets

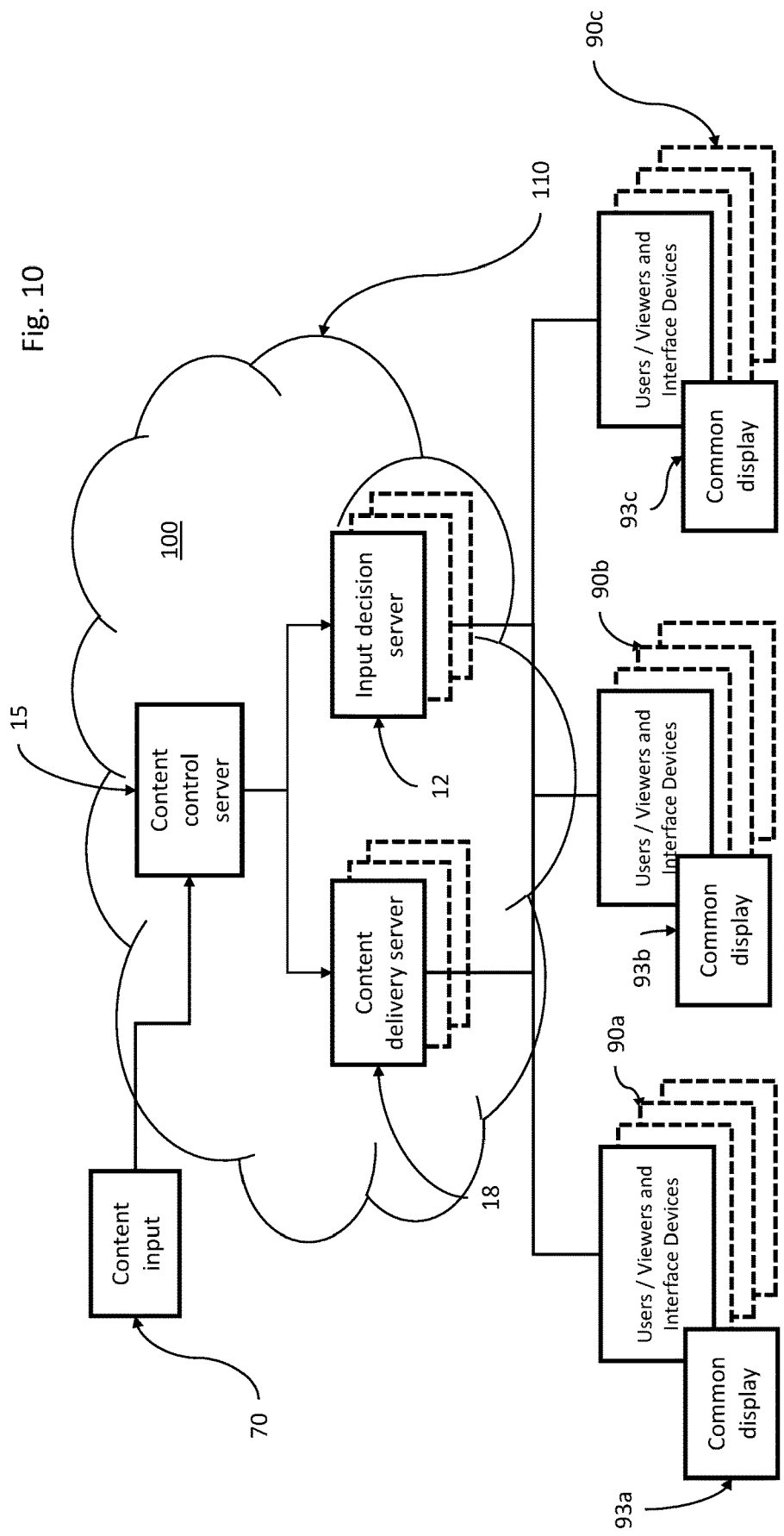

SYSTEMS AND METHODS FOR REAL-TIME USER VOTING CONTROL OF VIDEO MOVIE CONTENT

FIELD OF THE INVENTION

The present invention generally relates to the field of video streaming and video playback. More particularly, the following disclosure provides descriptions for systems and methods that allow for the hosting, real-time streaming, and control of video movie or video content playback, that specifically includes a voting procedure and mechanism that allows users or viewers to select and control alternative content playback. In one embodiment, the video content playback control and voting system comprises as system elements, at least one content control server ("CCS"), at least one user input decision server ("IDS"), at least one content delivery server ("CDS"), along with at least one video display and/or a plurality of user interface devices.

BACKGROUND DESCRIPTION AND REVIEW OF CERTAIN PRIOR ART

The demand for video streaming entertainment has increased rapidly since the initial days of video cassette recorders and players. That increase has only accelerated with the wide-spread individual user ability to stream video to most any location through use of the Internet and the cloud computing. Indeed, the demand for video streaming entertainment has pushed the boundaries in most all areas of video streaming technologies, including as relating to the quantity of data that can be transmitted or uploaded quickly, the quality of the video being transmitted, and as relating to the library or options of video content that is available for viewing.

There is no shortage of technologies and systems available to address these issues and to move the video streaming technology to the next level. One area that is not as developed is the ability to select options for video streaming during the viewing process and thereby alter the video content being viewed. Moreover, the ability to alter video content and still view such content in real-time, or in near real-time, has not been readily and commercially achieved. One of the many reasons for there not being operationally acceptable real-time video voting control systems is the difficulty in creating system and method architectures that distribute the operational and analytic functions that allow the systems to operate efficiently, essentially at real-time, and equally important, allow for the systems to be easily scaled from a single user to multiple users without degradation in video viewing performance.

Two examples of systems and methodologies that provide in some fashion, the ability for control of output based upon voting input are from Disney Enterprises, Inc. Both of U.S. Pat. No. 7,603,626 for a Method And System For Creating A Collaborative Work Over A Digital Network, by Williams et al., and U.S. Pat. No. 9,390,398 for Creating A Collaborative Work Over A Network, by Williams et al., describe systems and methods for having plurality of participants author and submit candidates to create a collaborative work over a computer network. While these two patents disclose a process for distributing "segment candidates" to a voting audience, and in response to votes received for "a favored segment candidate," there is no disclosure in either of the Williams et al. patents that provides a system architecture that allows for the real-time presentation of video content selections, and based upon aggregated user voting input, providing in real-time assembled and rendered video content determined as based upon the user voting input.

Accordingly, what is needed are systems and methods for hosting, streaming, and controlling video movie playback, where the video playback uses a local or cloud based voting platform, and the systems and methods have an architecture designed to provide reduced system latency, and are fully scalable from a single user to multi-viewer modes, with the latter mode allowing for thousands of users viewing the video playback, and controlling the content display through a collective voting platform.

SUMMARY OF THE INVENTION

The present invention overcomes the disadvantages of the prior art and fulfills the needs described above by providing systems and methods for video content playback selection, voting, and control.

A preferred embodiment of the invention is a video content and playback control and voting system comprising at least one content control server ("CCS"), at least one user input decision server ("IDS"), at least one content delivery server ("CDS"), and a plurality of user interface devices, wherein, the content control server ("CCS"):
 i. reads and stores video content input to be played back;
 ii. transmits user selection and voting options to said at least one user IDS;
 iii. receives user selection and voting input from said at least one user IDS;
 iv. receives user voting aggregations from said at least one user IDS;
 v. assembles and aligns said video content playback based upon aggregated and analyzed user selection and voting input received from said at least one user IDS; and
 vi. controls said video content input playback based upon said user selections and said user voting aggregations, with said content playback control being transmitted to said at least one CDS;
the user input decision server ("IDS"):
 i. receives said user selection and voting options from said at least one CCS;
 ii. transmits said user selection and voting options to said plurality of user interface devices;
 iii. receives said user selection and voting input from said plurality of user interface devices;
 iv. aggregates and analyzes said user selection and voting input received from said plurality of user interface devices; and
 v. transmits said aggregated and analyzed user selection and voting input to said at least one CCS;
the content delivery server ("CDS"):
 i. receives said video content playback from said at least one CCS based upon said aggregated and analyzed user selection and voting input;
 ii. converts and merges video content playback and renders into appropriate format for said plurality of user interface devices;
 iii. transmits said assembled and synchronized video content playback; and
the plurality of user interface devices, or the user display devices:
 i. receives said user selection and voting options from said at least one user input server;
 ii. displays said user selection and voting options to a plurality of users;
 iii. receives said user selection and voting input from said plurality of users; and iv. transmits said user selection and voting input to said at least one user IDS.

Another embodiment of the invention is a video content and playback control and voting methodology comprising at least one content control server, at least one user input server, at least one content delivery server, and a plurality of user interface devices, wherein said methodology comprises the steps of:
a. said at least one content control server,
   i. receiving video content input to be played back;
   ii. transmitting user selection and voting options to said at least one user IDS;
   iii. receiving user selection and voting input from said at least one user IDS;
   iv. receiving user voting aggregations from said at least one user IDS; and
   v. controlling said video content playback based upon said user selections and said user voting aggregations, with said content playback control being transmitted to said at least one CDS;
b. said at least one user input decision server,
   i. receiving said user selection and voting options from said at least one CCS;
   ii. transmitting said user selection and voting options to said plurality of user interface devices;
   iii. receiving said user selection and voting input from said plurality of user interface devices;
   iv. aggregating and analyzing said user selection and voting input received from said plurality of user interface devices; and
   v. transmitting said aggregated and analyzed user selection and voting input to said at least one CCS;
c. said at least one content delivery server,
   i. receiving said video content playback from said at least one CCS based upon said aggregated and analyzed user selection and voting input;
   ii. assembling said video content playback in approximately real time based upon said aggregated and analyzed user selection and voting input instructions received from said CCS;
   iii. transmitting said video content playback; and
d. said a plurality of user interface devices;
   i. receiving said user selection and voting options from said at least one user input server;
   ii. displaying said user selection and voting options;
   iii. receiving said user selection and voting input from said plurality of users; and
   iv. transmitting said user selection and voting input to said at least one user IDS.

BRIEF DESCRIPTION OF THE DRAWINGS

For the purposes of illustrating the invention, the attached drawings show certain aspects and embodiments that are presently preferred. However, it should be understood that the invention is not limited to the precise methodology or process steps or system elements as shown in the accompanying drawings, but rather is further disclosed and claimed according to the attached claims.

FIG. 10 is an illustrative system and process-flow diagram of an embodiment of the invention showing the system elements and communication flow between those elements where multiple input decision servers are used to receive selection and decisions input from multiple separately located individual users or viewers, and multiple content delivery servers are used to transmit and stream video playback content to the individual users or viewers who are located at the separate locations.

DETAILED DESCRIPTION OF CERTAIN EMBODIMENTS

Figure 1:
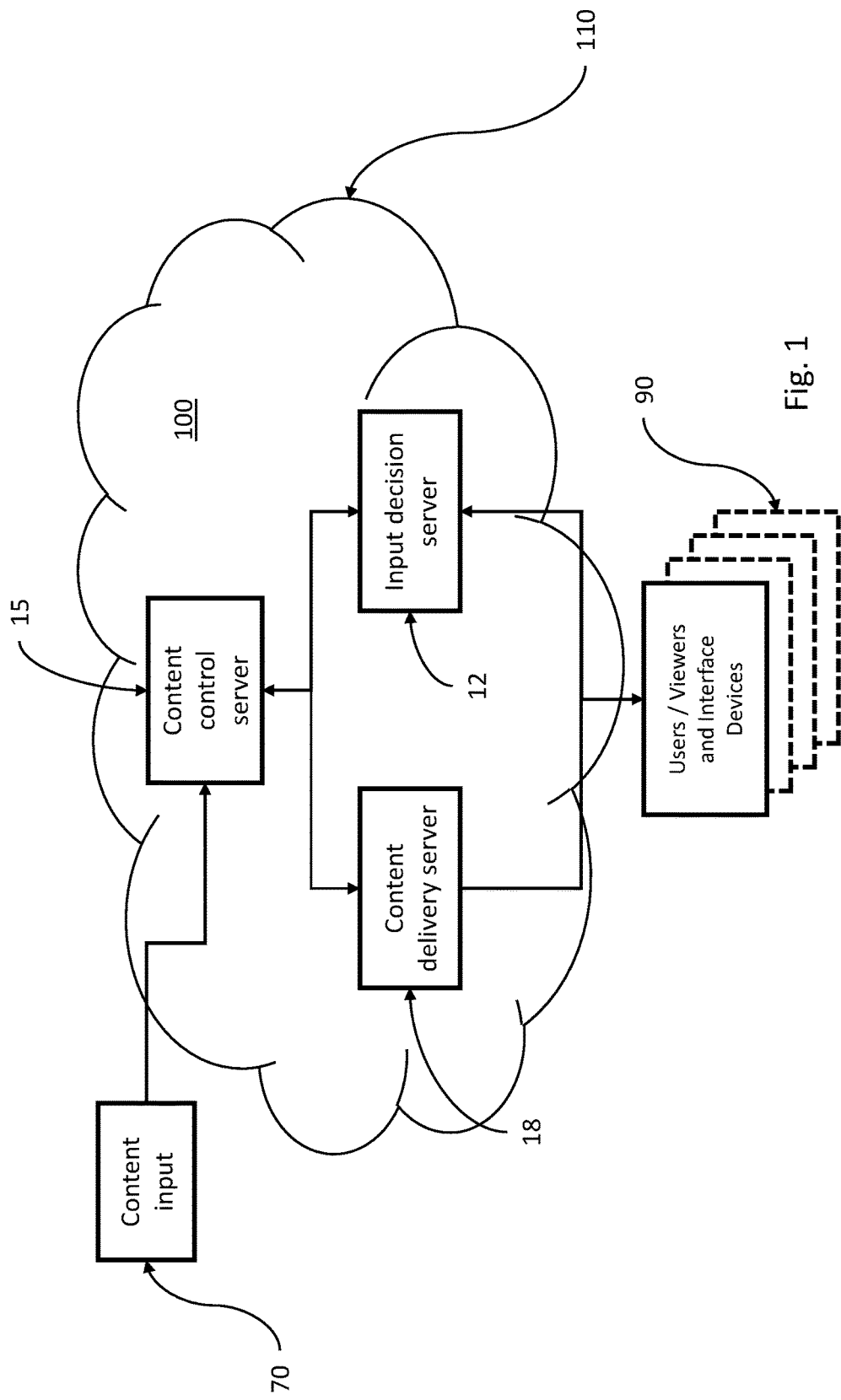
FIG. 1 is an illustrative system and process-flow diagram of an embodiment of the invention showing the core system elements and communication flow between those elements where the content is displayed to users or viewers.

The present invention provides an innovative solution to various problems relating to systems and methodologies designed to allow single or multiple viewer/user real-time voting control of video movie content playback. More particularly, the present invention teaches several systems and methods for hosting, streaming, and controlling video movie content playback. An innovation of the video playback systems and methods is that they use a local or cloud based voting platform that is fully scalable from a single user to multi-viewer modes. In a primary embodiment, the systems and methodologies allow a user or multiple users to select alternative content streaming options. Where configured for the multi-viewer mode, the system allows for thousands of users to view and, in real-time, control the video content playback through a collective or aggregated voting platform.

For clarity and ease of understanding, as used herein the term "server" is intended to mean, and may be used interchangeably with the terms "computer," "processor," "processing unit," "processing node," or "computing device." As used herein, "server" may be a physical machine or software that is operated on one or more physical or virtual (e.g., cloud) machines. Similarly, the term "platform" is intended to mean, and may be used interchangeably with the terms "system," "software," "firmware," or any collection of software, firmware, and hardware systems providing control and output.

Moreover, for clarity, the term "real-time" as used herein is intended to mean "near real-time" in the context of human visual perception and average human reaction time. Accordingly, "real-time" video streaming platforms are generally recognized as being able to achieve a glass-to-glass delivery (or in this context server-to-glass delivery) with a delay of less than or equal to 300 milli-seconds.

Further, for clarity, the term "streaming" as used herein means any form of delivery of video frames (images) and corresponding audio samples for display on one or more viewing devices such as but without limitation a mobile phone, a handheld computing device (e.g., a phablet or tablet), computer screen, television set, LED screen, and/or a video projector, each of which may be at home or in a movie theater, along with one or more corresponding audio systems.

In various embodiments, as illustrated in FIGS. 1 through 10, the disclosed system 100 includes four primary or core elements. Those system elements comprise, as illustrated in one embodiment in FIG. 1, (a) a content control server ("CCS") 15, (b) a data or input decision server ("IDS") 12, (c) a content delivery server ("CDS") 18, and (d) at least one user interface/display device 90. These elements, the CCS 15, IDS 12, CDS 18, along with the user interface/display device 90, comprise the core of the disclosed video streaming voting and control system 100 that allows for user control of the video content being streamed where the video content is determine from selection of content options provided through the video content input 70 data files.

Figure 2:
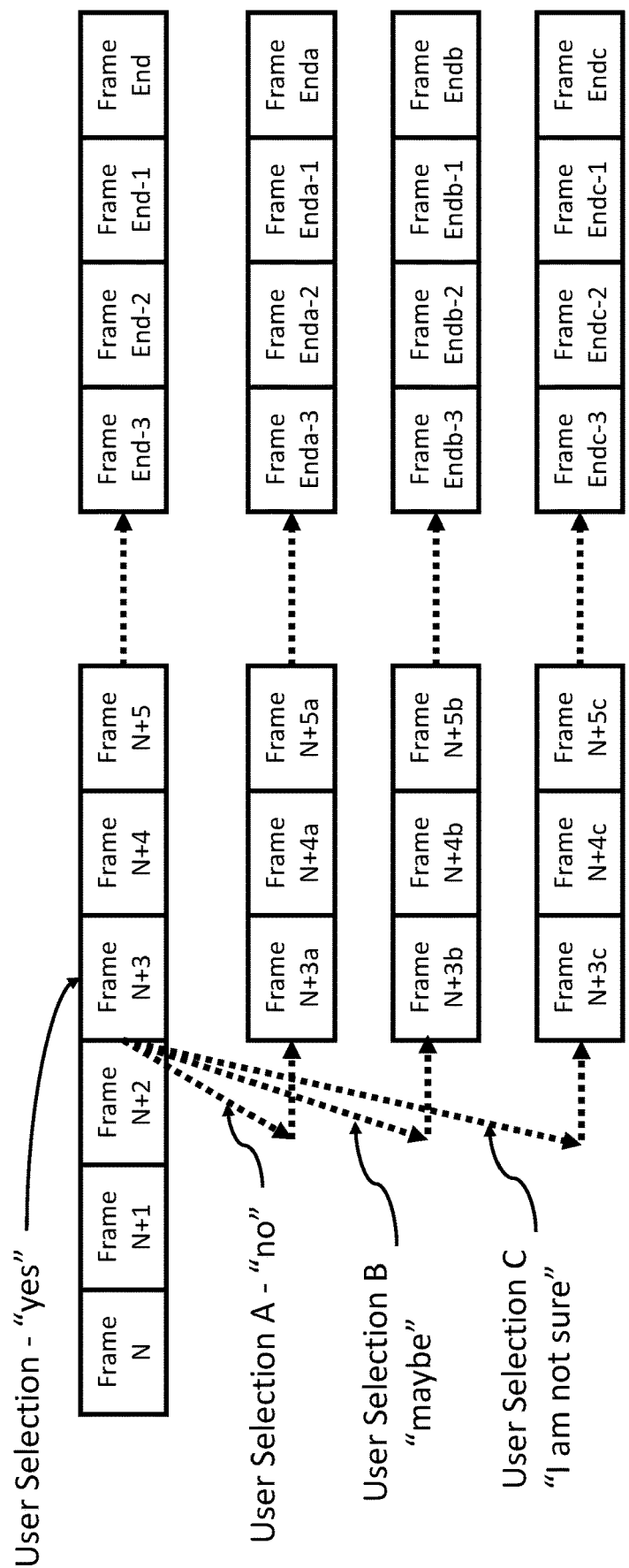
FIG. 2 is an illustrative frame flow decision tree showing user selections of one of four video content presentations from a single Frame N+2.
Figure 3:
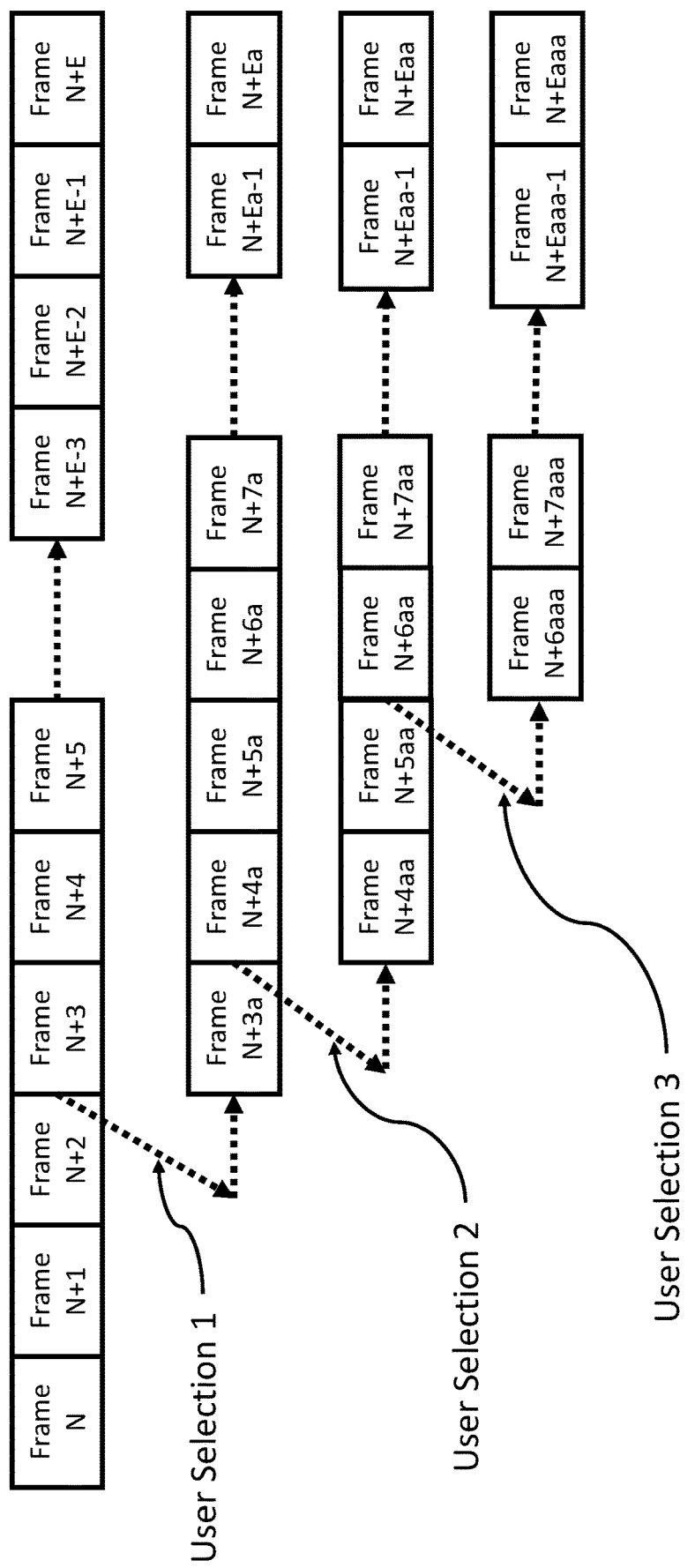
FIG. 3 is an illustrative frame flow decision tree showing user selections of one of four video content presentations from three different frame decision trees.

To assist in understanding the operation of the system, including what is meant by user voting control of the video playback content, an illustrative example is provided. FIGS. 2 and 3 show exemplary frame flows and the voting choices that may result in varied video content being streamed to the user display device 90 or devices 93. As shown in FIG. 2, a first video stream, being the top series of frames, shows the video content having frames N through End. According to an embodiment of the system, at Frame N+2, there may be a decision or forking point where alternative frames or video content may be streamed to the user. For example, as shown in FIG. 2, at Frame N+2 a character may be faced with a question or choice, with his or her choices being to say "yes," "no," "maybe" or "I am not sure." If the user selection is for the character says "yes," the video content follows along to Frames N+3, N+4 and so to Frame End. If the user selection is for the character says "no," the video content would instead continue along the second frame flow to Frames N+3a, N+4a, N+5a and so on to Frame Enda. Similarly, if the user selection is for the character to say "maybe," the video content would instead continue along the third frame flow to Frames N+3b, N+4b, N+5b and so on to Frame Endb, and finally, if the user selection is for the character to say, "I am not sure," the video content stream would continue along the fourth frame flow shown in FIG. 2, to Frame N+3c, N+4c, N+5c through to Frame Endc. Importantly, this change in video content flow occurs in real-time based upon the voting selection where there is a single user, or based upon the aggregated voting selections where there are multiple users or viewers.

While the FIG. 2 frame flow shows a single fork in alternative video streams, with multiple decision options, embodiments of the claimed systems and methods allow for multiple decision options during the video streaming. As shown in FIG. 3, a first user selection tree is available are Frame N+2, with a second user selection decision tree being provided at Frame N+3a, and a third user selection decision tree provided at Frame N+5aa. The FIG. 3 example shows that based upon user voting selections, four different video content presentations may be streamed to the users based upon the user's voting selections.

While the FIG. 1 embodiment illustrates each of the CCS 15, IDS 12, and CDS 18 as being housed and operated within a cloud 110 platform, each of these elements alternatively may be configured and operated locally or through a private or global communications network or cloud. The Internet is an example of the cloud or a global communications network. Similarly, a private Wi-Fi network would be an example of a private communications network operated by a single entity or at a single location. Moreover, the CCS 15, IDS 12, and CDS 18 may reside on the cloud 110, as shown in FIG. 1, while the content input 70, or content video data files may be maintained outside of the cloud 110. In such a system architecture, the content input 70 could be read or batch loaded to the CCS 15 prior to the streaming operation.

Each of the CCS 15, IDS 12, and CDS 18 have particular capabilities and functions to ensure the platform operates efficiently and properly to allow the users to control and manage the content input 70 in a fashion desired by the users. A core aspect of the efficient and proper operation of the system and platform is to ensure very low latency relating to information and data transmission, so that the "real-time" video streaming is provided to one or multiple users.

The four primary system elements each undertake respective operations or steps to provide efficient operation of the platform. The general operations of the system that allow for user control of video content section entails the steps of:

providing selection options to the users eliciting, in real-time, and collecting user selection and voting input based upon the selection options aggregating and analyzing, in real-time, the collected user selection and voting input assemble and render, in real-time, the video content based upon the aggregated and analyzed user selection and voting input; and transmitting or streaming the assembled and rendered video content to the users display devices or a common display device.

In more particularity, in terms of operative steps, the content control server 15 renders and controls the movie content 70 to be streamed and displayed to the users through the users interface/display devices 90 and/or a common display device 93. The input decision server 12 manages the user input and voting that is transmitted to the content control server 15 to assemble the video content 70 to be rendered and transmitted to the users. The input decision server 12 also provides the users with the various selection and voting options in order to elicit user selections and user votes. The content delivery server 18 acts as the delivery element to stream the assembled and rendered video content to the users 90.

The Content Control Server 15

In further detail, in certain embodiments, the functions of the CCS 15 include at least the (a) transmission of the user selection and voting options to the IDS 12, which such user selection and voting options being used to select and control the video content playback; (b) receipt back from the IDS 12 of the user selection options; (c) receipt back from the IDS 12 of the aggregated and analyzed voting inputs; and (d) then assimilation, gathering and synchronization of the video, audio and subtitle content to be streamed based upon the input from the IDS 12 for user selection options and the aggregated and analyzed voting inputs.

More particularly, in one embodiment, the content control server, CCS 15, stores and reads the video content input 70 to be organized and played back for the end users. Such interactive video content input 70 includes user selection and voting options, where by way of example, the user selection options may include features such as video language options, whether to include subtitles or not within the video stream, and the language for the subtitles and voting options.

As noted, the CCS 15 transmits user selection and voting options to the IDS 12, and then receives back from the IDS 12 the specific user selection and voting input that has been received by the IDS 12 from the users devices 90. With respect to the voting input, the CCS 15 receives such input, which in the case of multiple users 90, may be user voting aggregations determined by the IDS 12. Such voting aggregations or voting selections received from the IDS 12, are used by the CCS 15 to properly assemble, align, and render the video content playback as illustrated in FIGS. 2 and 3. More particularly, the CCS 15 uses the aggregated and analyzed user selection and voting input received from the IDS 12 to order and organize the content input 70 according to the user selection and voting input. Accordingly, the CCS 15 controls said video content playback based upon said user selections and said user voting aggregations. In other embodiments, the CCS 15 may aggregate and analyze the raw user voting input received from the IDS 12, such that the aggregation and analysis is undertaken by the CCS 15 and not the IDS 15. Once assembled and rendered by the CCS 15, the video content playback is the transmitted to the CDS 18.

The Input Decision Server 12

As with the CCS 15, the IDS 12 has, in certain embodiments, particular functions of operation. Those functions of the IDS 12 include at least the (a) receipt of the user selection, including a user's election to refrain from selecting an option, and voting options from the CCS 15, which such user selection and voting options are used to select and control the video content playback; (b) transmission of the user selection and voting options to the users; (c) receipt back from the user devices 90 of the user selection options; (d) receipt back from the user devices 90 of the user voting inputs; (e) collection, analysis, and aggregation of the user selection options; (f) collection, analysis, and aggregation of the user voting inputs; (g) transmission of the raw user voting inputs back to the CCS 15, and/or transmission of the analyzed and aggregated user voting inputs back to the CCS 15.

As described above, the IDS 12 essentially operates as a system manager of input and data flows by receiving, transmitting, and analyzing various user selection and user video voting inputs. More specifically, in an embodiment of the system 100, as shown in FIG. 1, the input decision server 12 receives the user selection options (such as language choices and subtitle options), and the several video content voting options from the CCS 15, and then transmits the user selection and voting options to said users or plurality of user devices 90.

The IDS 12 also, in turn, receives the user selection and voting input back from the user interface devices or, where there are multiple users, from the plurality of user interface devices 90 based upon the selections and input or voting from the respective users. The IDS 12 then aggregates and analyzes the user selection and voting input received from the plurality of user interface devices 90. After aggregation and analysis of the user selection and voting input, the IDS 12 then transmits the aggregated and analyzed user selection and voting input to the CCS 15 for use by the CCS 15 in assembling the video content according to the selections and voting input from the user devices 90 as described above.

In other embodiments, where server capacity and processing bandwidth may be limited, the operation of user selection and voting input received from the plurality of user interface devices 90 may be simply transferred by the IDS 12 to the CCS 15, such that the user selection and voting input aggregation and analysis may be handled by the CCS 15.

The Content Delivery Server 18

As with the CCS 15 and IDS 12, the CDS 18 has, in certain embodiments, certain core functions of operation as part of the system operation. The primary functions of the CDS 18 include at least the (a) receipt of the assembled and rendered video content 70 from the CCS 15; (b) rendering, transcoding, transmission of the assembled and synchronized content 70 to the user display device or devices 90. As described above, the assembling and rendering of the video content, that is undertaken by the CCS 15, is based upon the aggregated and analyzed user selection and voting input, that is transmitted to the CCS 15 from the IDS 12.

Accordingly, the basic operation of the CDS 18 is to "deliver" the assembled and rendered video content, received from the CCS 15, as determined from input and voting selections made by the users. In certain embodiments, the CDS 18 may need to merge or down mix the video content as received from the CCS 15. Moreover, in other certain embodiments, the CDS 18 may need to convert, into an appropriate format, the assembled and synchronized video content received from the CCS 15, prior to transmission of the video content to the user interface or display devices 90.

The User Interface/Display Devices 90, Common Display Device 93

The plurality of user interface/display devices 90, being the interface with the user or users, also have certain functions as part of the system operation. More particularly, the user interface/display devices 90 (a) receive the user selection and voting options from the IDS 12; (b) display the various selection and voting options to the users; (c) receive the respective user inputs in response to the various selection and voting options; (d) transmits the user selection and voting inputs back to the IDS 12 for appropriate analysis; and (e) receives the assembled, rendered, and synchronized video content 70 as transmitted from the CDS 18.

Figure 4:
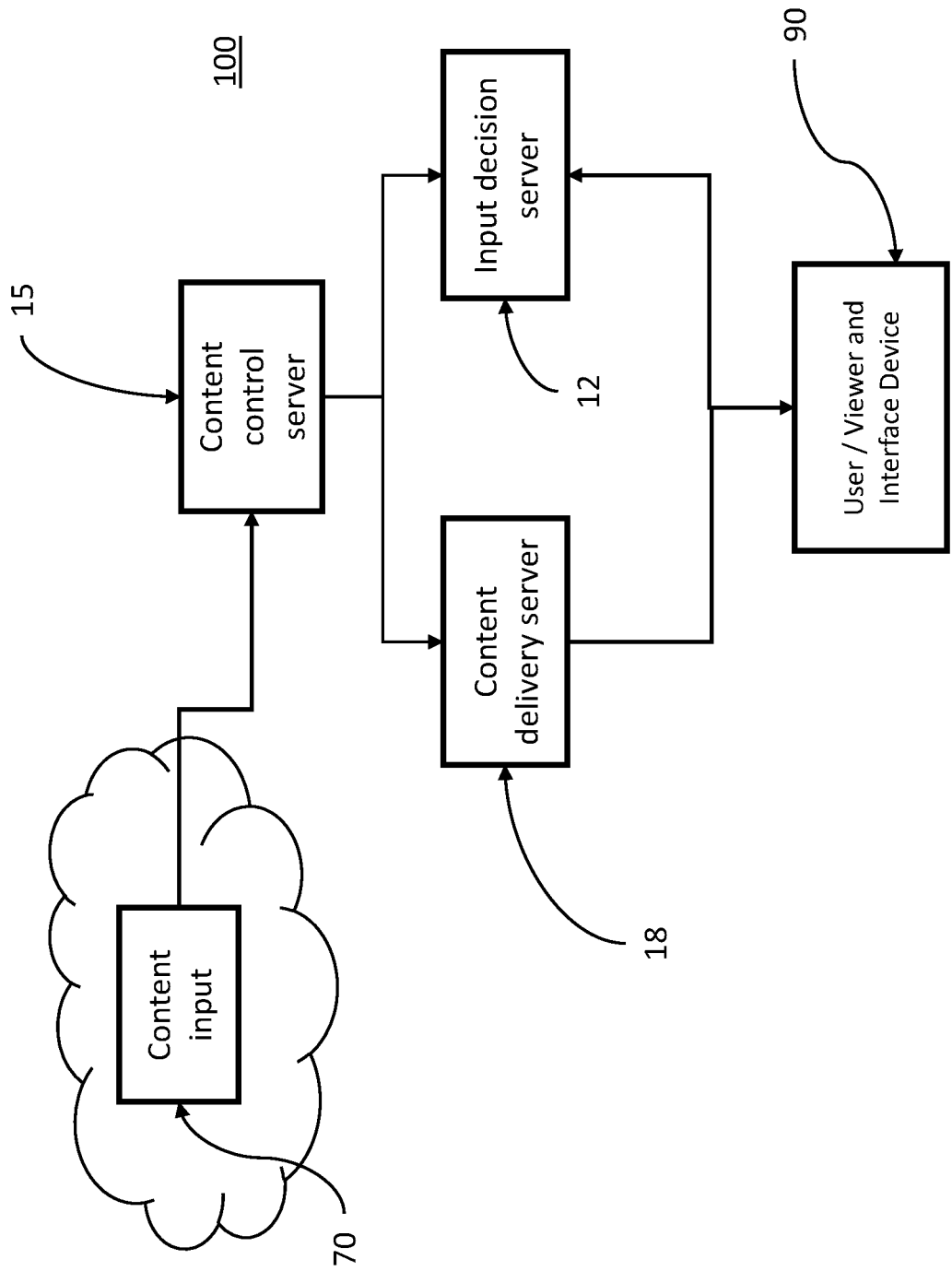
FIG. 4 is another illustrative system and process-flow diagram of an embodiment of the invention showing the core system elements and communication flow between those elements where the content is displayed on an individual user viewing device.

While the system embodiment illustrated in FIG. 1 provides for multiple users and user interface/display devices 90, the system may also operate, as shown in FIG. 4 with a single user or single user interface/display device. As shown in FIG. 4, the system may be configured with the CCS 15, IDS 12, CDS 18, and single user, interface/display device 90 as being local and not maintained in the cloud. Such an architecture would be applicable for "off-line" video viewing on a user's smart phone or smart tablet, for example, on an airplane or in a location where operational (e.g., adequate bandwidth and response time) connectivity is not possible. In such a configuration, the video content 70 may be downloaded prior to video streaming from the cloud to the CCS 15.

Figure 5:
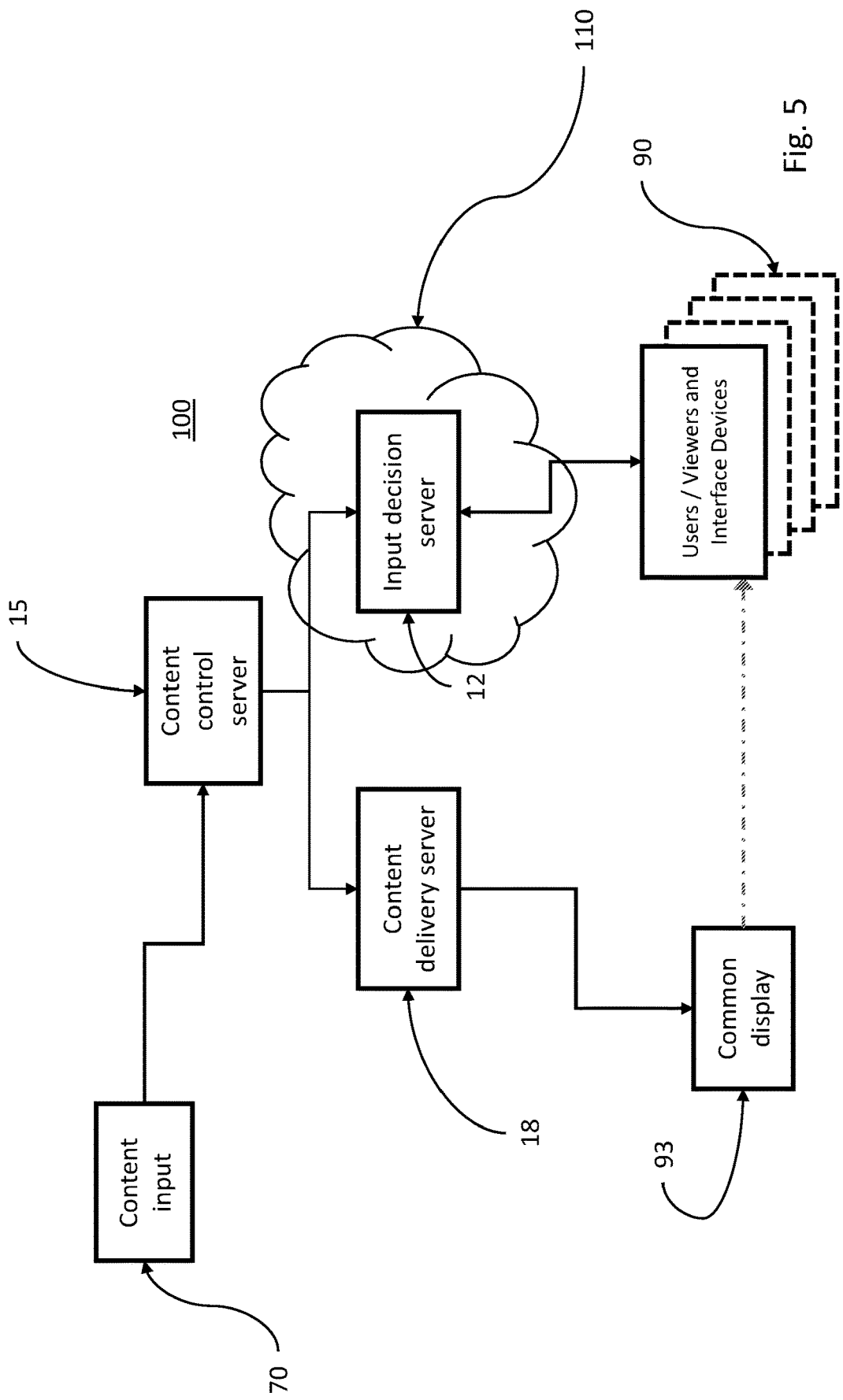
FIG. 5 is an illustrative system and process-flow diagram of an embodiment of the invention showing the system elements and communication flow between those elements and a common display device being view by multiple users or viewers and with the input decision server maintained in the cloud.

Another architecture for operation of embodiments of the system could provide for a single common display device 93, as illustrated in FIG. 5. Such a configuration could be, for example, a large or smaller movie or entertainment center theatre setting where multiple users are viewing a single common display device 93 that is separate from each user interface device 90. In such a configuration, each of the users may have their own interface devices 90, which may be their own smart phones or smart tablets. Alternatively, in such a theatre configuration, the setting may provide individual interface devices 90 at each user seat or user location. Such individual interface devices 90 may be as simple as a key pad with or without a simple display so that the user can see his or her selection and voting input.

Figure 6:
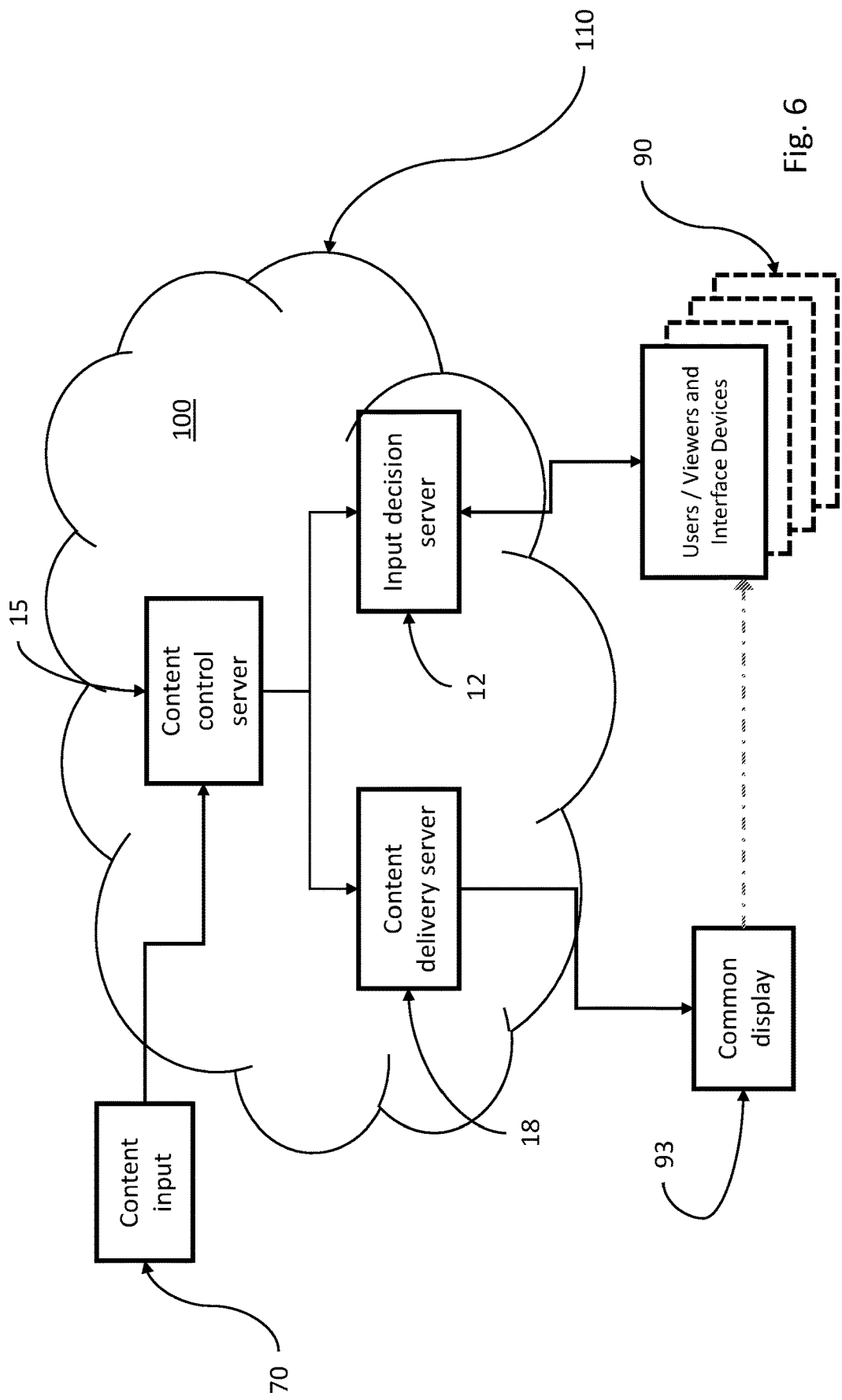
FIG. 6 is an illustrative system and process-flow diagram of an embodiment of the invention showing the system elements and communication flow between those elements and a common display device being viewed by multiple users or viewers and with the system elements each being maintained in the cloud.

As shown in FIG. 5, for one example of a theatre architecture embodiment, the CCS 15, CDS 18, common display 93, user interface devices 90, and content input 70 may all be locally operated at a single location, while the IDS 12 may be operated through the cloud 110. In a variation of this architecture, the IDS 12 may also be locally operated at the same location as the CCS 15, the CDS 18, and/or the users and user interface devices 90. A further embodiment of such a theatre setting, as illustrated in FIG. 6, provides that each of the CCS 15, IDS 12 and CDS 18 are maintained and operated through the cloud 110. A further embodiment of this latter architecture could entail the video content input 70 also being housed on the cloud 110.

Alternative System Architectures

Figure 7:
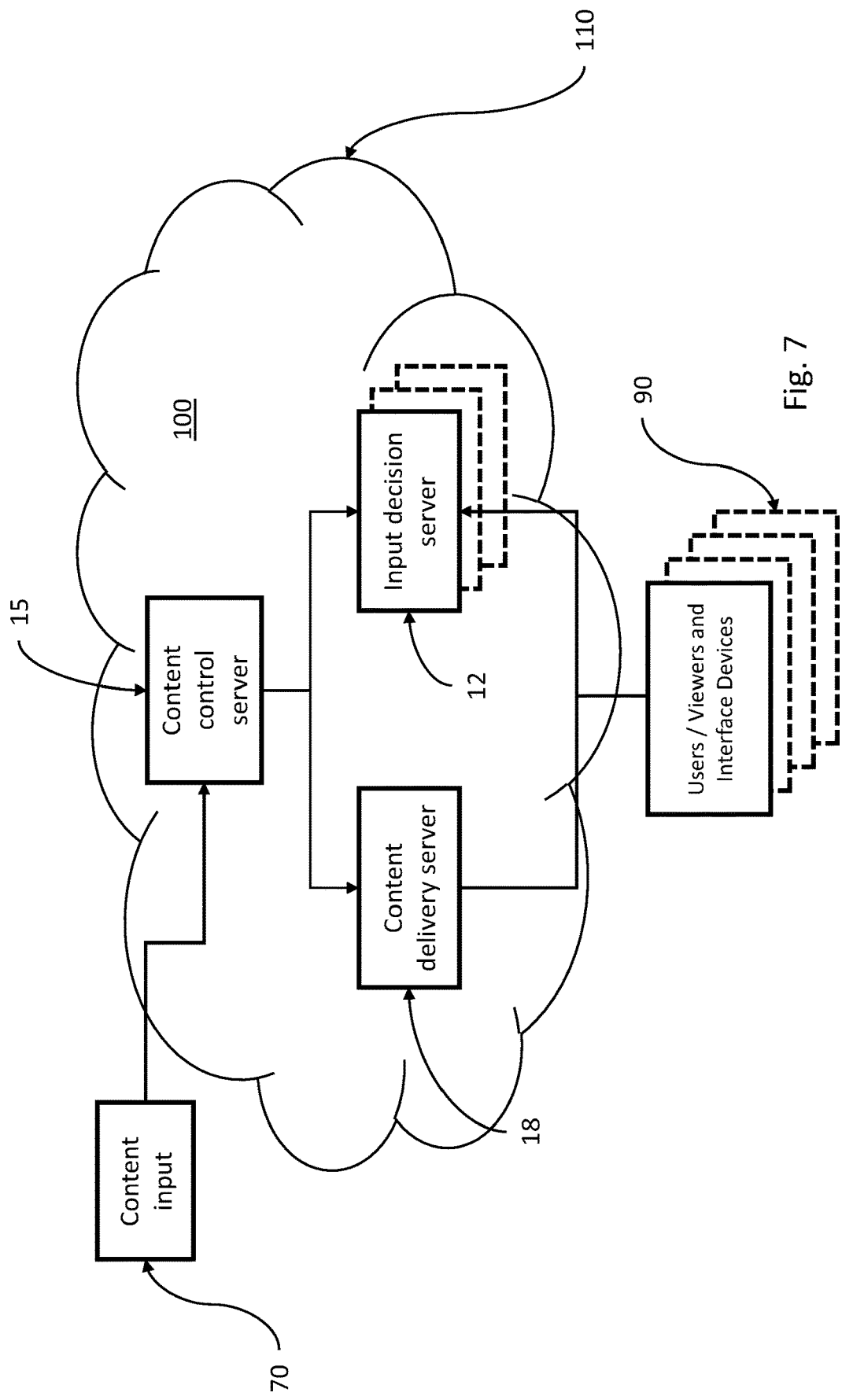
FIG. 7 is an illustrative system and process-flow diagram of an embodiment of the invention showing the system elements and communication flow between those elements where multiple input decision servers are used to transmit, receive, analyze, and aggregate video input and video content voting control from multiple users or viewers.
Figure 8:
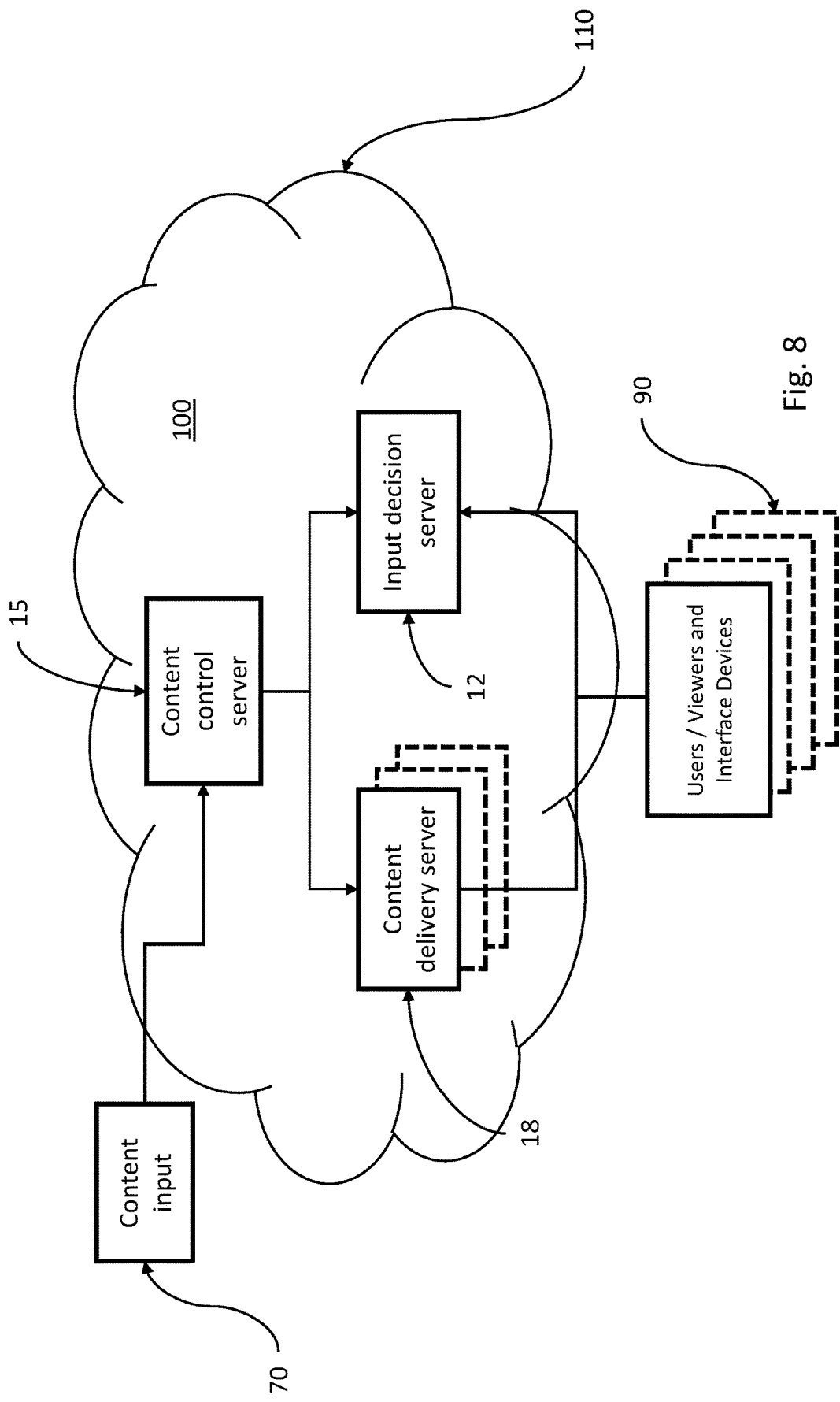
FIG. 8 is an illustrative system and process-flow diagram of an embodiment of the invention showing the system elements and communication flow between those elements where multiple content delivery servers receive and transmit assembled and rendered video content to users or viewers.

While described above and illustrated in FIGS. 1, 4, 5, and 6 as having a single IDS 12 and single CDS 18, in order to allow for scaling of the system for multiple locations and with a large numbers of users or viewers with associated interface devices 90, other embodiments of the system 100 may incorporate a plurality of input decision servers 12, as shown in FIG. 7, and/or a plurality of content delivery servers 18, as shown in FIG. 8. The architectures having a plurality of IDS 12 and plurality of CDS 18 could readily accommodate users and user interface devices 90 being located in different locations, different geographies, and/or even different time zones. Where a plurality of IDS 12 are operating, each such IDS 12 communicates, in real-time, with each of the other IDS 12 to properly aggregate and analyze all of the users selection and voting input.

Figure 9:
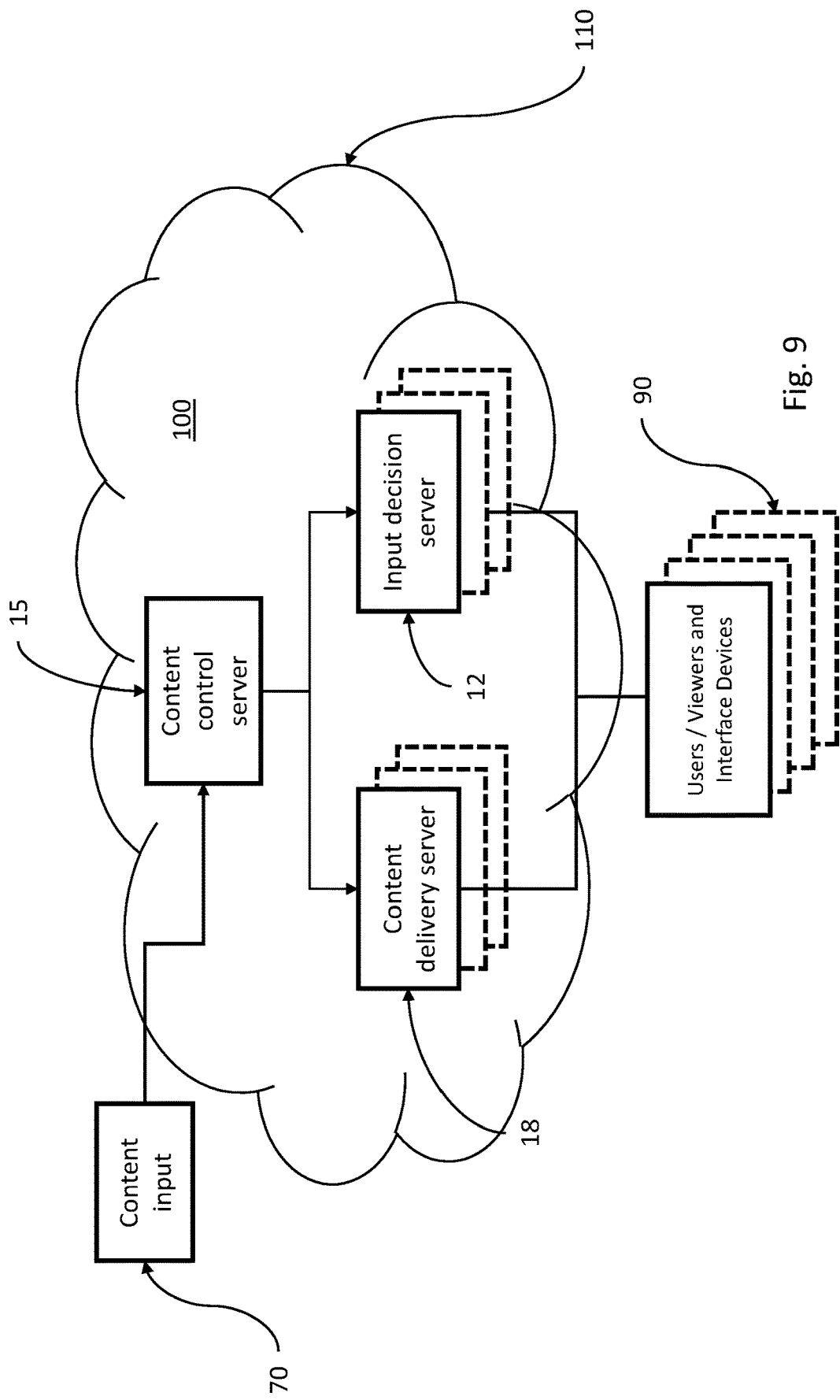
FIG. 9 is an illustrative system and process-flow diagram of an embodiment of the invention showing the system elements and communication flow between those elements where multiple input decision servers and multiple content delivery servers are implemented to respectively transmit, receive, analyze, and aggregate video input and video content voting control, and to receive and transmit assembled and rendered video content to users or viewers.

In further embodiments, as shown in FIG. 9, the system could provide for both a plurality of IDS 18 and CDS 18 to efficiently handle large numbers of users, possibly at different locations, and critically important, handling such data and content transmission in a near real-time manner so that the user does not notice any perceptible break in the video streaming. As a further embodiment, and expansion of the architecture shown in FIG. 9, the system could readily be scaled to provide user voting control of video content playback where there are multiple users located in multiple disparate locations. This architecture, illustrated in FIG. 10, may be exemplified by multiple users having multiple interface devices 90a, 90b, 90c, where the multiple users are located in different theatres, with each theatre having a common display 93a, 93b, 93c that is being viewed by the respective multiple users. As illustrated in FIG. 10, each of the CCS 15, IDS 12, and CDS 18 are maintained in the cloud 110, however, in alternative configurations, similar to that illustrated in FIG. 5, the respective CCS 15 and CDS 18 may be located at one of the theatre locations. Each of these architecture would nonetheless require that each of the CCS 15, IDS 12, and CDS 18 being real-time communication with the other CCS 15, IDS 12, and CDS 18 to ensure consistent assembly, rendering and presentation of the real-time video streaming.

As described, the design of the system architecture and the specific separation of operations and tasks between the CCS 15, IDS 12, and CDS 18 provides for low transmission latency, and further, provides a ready means for scaling of the system to accommodate for multiple users, multiple user interface devices, and as described, multiple users and user interface devices located in multiple disparate geographies.

While preferred embodiments of the inventive systems and methods have been described and disclosed, in particular with reference to certain figures and exemplary embodiments for an innovative means for hosting, streaming, and controlling video movie playback, such exemplary embodiments are not to be construed as limiting the scope of application of the inventive methods or systems.

While the application of the methods and systems described herein focused on certain architectures for video systems and single or multiple displays, the described methods and systems could be readily applied to various other architectures and configurations, including movie theatres having a common large screen display; separate home displays; and/or separate individual user display devices (such as a smartphone, tablet, or terminal).

It will be recognized by those skilled in the art that other modifications, substitutions, and/or other applications are possible and such modifications, substitutions, and applications are within the true scope and spirit of the present invention. It is likewise understood that the attached claims are intended to cover all such modifications, substitutions, and/or applications.

What is claimed is:

1. A video content playback control and voting system, comprising at least one content control server ("CCS"), at least one user input decision server ("IDS"), at least one content delivery server ("CDS"), and a plurality of user interface devices, wherein,
   a. said at least one content control server ("CCS"),
      i. stores and reads video content input to be played back;
      ii. transmits user selection and voting options to said at least one user IDS;
      iii. receives user selection and voting input from said at least one user IDS;
      iv. receives user voting aggregations from said at least one user IDS;
      v. assembles and aligns said video content playback based upon aggregated and analyzed user selection and voting input received from said at least one user IDS; and
      vi. controls said video content playback based upon said user selections and said user voting aggregations, with said content playback control being transmitted to said at least one CDS;
   b. said at least one user input decision server ("IDS"),
      i. receives said user selection and voting options from said at least one CCS;
      ii. transmits said user selection and voting options to said plurality of user interface devices;

iii. receives said user selection and voting input from said plurality of user interface devices; and
iv. transmits said aggregated and analyzed user selection and voting input to said at least one CCS;
c. said at least one content delivery server ("CDS"),
i. receives said video content playback from said at least one CCS based upon said aggregated and analyzed user selection and voting input;
ii. converts and merges said video content playback and renders into appropriate format for said plurality of user interface devices;
iii. transmits said assembled and synchronized video content playback; and
d. said plurality of user interface devices;
i. receives said user selection and voting options from said at least one user input server;
ii. displays said user selection and voting options;
iii. receives said user selection and voting input; and
iv. transmits said user selection and voting input to said at least one user IDS.

2. The video content playback control and voting system, as provided in claim 1, wherein said transmission of said video content playback by said at least one CDS, in step (c)(iii), is to a common display device.

3. The video content playback control and voting system, as provided in claim 1, wherein said transmission of said video content playback by said at least one CDS, in step (c)(iii), is to said plurality of user interface devices, and said plurality of user interface devices receive said video content playback from said at least one CDS.

4. The video content playback control and voting system, as provided in claim 1, further comprising wherein said at least one CCS aggregates and analyzes said user selection and voting input received from said plurality of user interface devices.

5. The video content playback control and voting system, as provided in claim 1, further comprising wherein said at least one user IDS aggregates and analyzes said user selection and voting input received from said plurality of user interface devices.

6. The video content playback control and voting system, as provided in claim 1, wherein said assembly and alignment of said video content playback of step (a)(v) is accomplished in approximately real time.

7. The video content playback control and voting system, as provided in claim 1, wherein said merging and converting of said video content playback includes at least one of merging and converting audio input, video input, language selection input, subtitle selection input, and graphic overlays.

8. The video content playback control and voting system, as provided in claim 1, wherein said at least one CDS and said at least one user IDS are a single server.

9. The video content playback control and voting system, as provided in claim 1, wherein said video content is hosted remotely within at least one cloud server.

10. The video content playback control and voting system, as provided in claim 1, wherein said video content is hosted within said plurality of user interface devices.

11. The video content playback control and voting system, as provided in claim 1, wherein said user selection and voting options comprise at least one of video content language options and subtitle display options.

12. A video content playback control and voting methodology, comprising at least one content control server, at least one input decision server, at least one content delivery server, and a plurality of user interface devices, wherein said methodology comprises the steps of:
a. said at least one content control server,
i. receiving video content input to be played back;
ii. transmitting user selection and voting options to said at least one user IDS;
iii. receiving user selection and voting input from said at least one user IDS;
iv. receiving user voting aggregations from said at least one user IDS; and
v. controlling said video content playback based upon said user selections and said user voting aggregations, with said content playback control being transmitted to said at least one CDS;
b. said at least one input decision server,
i. receiving said user selection and voting options from said at least one CCS;
ii. transmitting said user selection and voting options to said plurality of user interface devices;
iii. receiving said user selection and voting input from said plurality of user interface devices;
iv. aggregating and analyzing said user selection and voting input received from said plurality of user interface devices; and
v. transmitting said aggregated and analyzed user selection and voting input to said at least one CCS;
c. said at least one content delivery server,
i. receiving said video content playback from said at least one CCS based upon said aggregated and analyzed user selection and voting input;
ii. assembling said video content playback in approximately real time based upon said aggregated and analyzed user selection and voting input
iii. transmitting said video content playback to one or more display devices; and
d. said a plurality of user interface devices,
i. receiving said user selection and voting options from said at least one user input decision server;
ii. displaying said user selection and voting options;
iii. receiving said user selection and voting input; and
iv. transmitting said user selection and voting input to said at least one user IDS.

13. The video content playback control and voting methodology, as provided in claim 12, wherein said transmission of said video content playback by said at least one CDS, in step (c)(iii), is to a common display device.

14. The video content playback control and voting methodology, as provided in claim 12, wherein said transmission of said video content playback by said at least one CDS, in step (c)(iii), is to said plurality of user interface devices, and said plurality of user interface devices receive said video content playback from said at least one CDS.

15. The video content playback control and voting methodology, as provided in claim 12, wherein said assembly and alignment of said video content playback of step (a)(v) is accomplished in approximately real time.

16. The video content playback control and voting methodology, as provided in claim 12, wherein said merging and converting of said video content playback includes at least one of merging and converting audio input, video input, language selection input, subtitle selection input, and graphic overlays.

17. The video content playback control and voting methodology, as provided in claim 12, wherein said video content is hosted remotely within at least one cloud server.

18. The video content playback control and voting methodology, as provided in claim 12, wherein said video content is hosted within said plurality of user interface.

19. The video content playback control and voting methodology, as provided in claim 12, wherein said user selection and voting options comprise at least one of video content language options and subtitle display options.

\* \* \* \* \*